(12) United States Patent
Frenger et al.

(10) Patent No.: US 11,153,809 B2
(45) Date of Patent: Oct. 19, 2021

(54) MANAGING DEDICATED AND COMMON SYSTEM INFORMATION

(71) Applicant: TELEFONAKTIEBOLAGET LM ERICSSON (PUBL), Stockholm (SE)

(72) Inventors: Pål Frenger, Linköping (SE); Johan Rune, Lidingö (SE); Stefan Wager, Espoo (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 171 days.

(21) Appl. No.: 16/475,612

(22) PCT Filed: Jan. 5, 2018

(86) PCT No.: PCT/IB2018/050089
§ 371 (c)(1),
(2) Date: Jul. 2, 2019

(87) PCT Pub. No.: WO2018/127843
PCT Pub. Date: Jul. 12, 2018

(65) Prior Publication Data
US 2021/0136661 A1    May 6, 2021

Related U.S. Application Data

(60) Provisional application No. 62/442,733, filed on Jan. 5, 2017.

(51) Int. Cl.
*H04W 48/12* (2009.01)
*H04W 48/14* (2009.01)
*H04W 48/16* (2009.01)

(52) U.S. Cl.
CPC .......... *H04W 48/12* (2013.01); *H04W 48/14* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 10,484,890 B2* | 11/2019 | Lin | H04L 27/2602 |
| 2009/0253422 A1 | 10/2009 | Fischer | |
| 2016/0021584 A1 | 1/2016 | Zhang et al. | |
| 2019/0274091 A1* | 9/2019 | Tang | H04W 48/12 |

FOREIGN PATENT DOCUMENTS

| | | |
|---|---|---|
| EP | 1190582 A1 | 3/2002 |
| RU | 2446631 C2 | 3/2012 |

* cited by examiner

*Primary Examiner* — Hong S Cho

(57) ABSTRACT

A method for managing dedicated and common system information that includes receiving a first message comprising a first set of parameters associated with system information. The first set of parameters have a first validity. The method also includes deriving a stored set of parameters based, at least in part, on the first set of parameters and its associated validity. The method additionally includes receiving a second message comprising a second set of parameters associated with system information. The second set of parameters have a second validity. The method further includes, upon the second validity superseding the first validity, modifying the stored set of parameters.

19 Claims, 9 Drawing Sheets

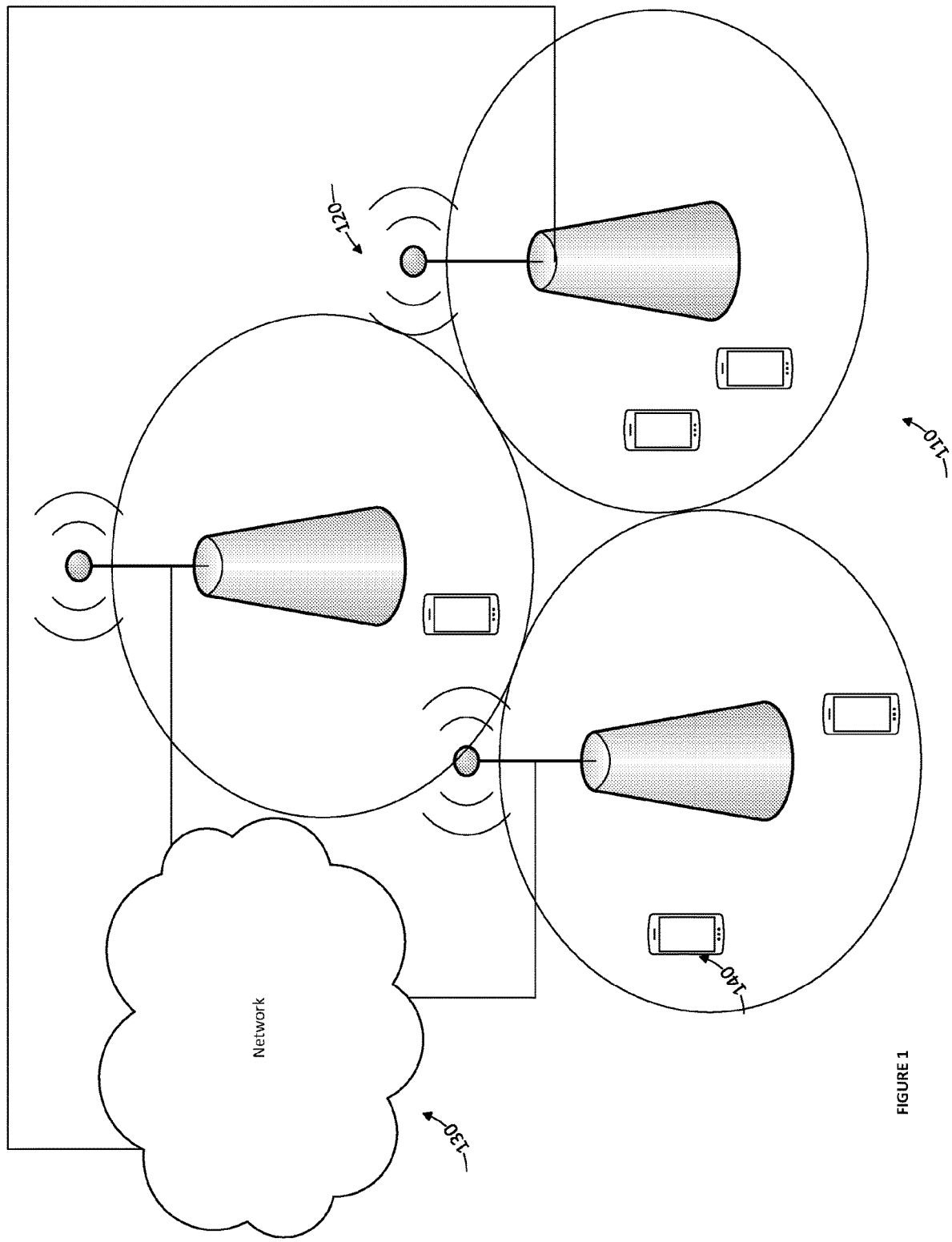

MANAGING DEDICATED AND COMMON SYSTEM INFORMATION

This application is a 371 of International Application No. PCT/IB2018/050089, filed Jan. 5, 2018, which claims the benefit of U.S. Application No. 62/442,733, filed Jan. 5, 2017, the disclosures of which are fully incorporated herein by reference.

TECHNICAL FIELD

The present invention is directed, in general, to communication systems and, more specifically, to managing dedicated and common system information.

BACKGROUND

In current communication systems, the treatment of dedicated system information ("SI") that is unicast to a wireless communication device such as a user equipment ("UE") in view of common SI that is broadcast from a radio access node such as a base station is unclear. When the UE receives dedicated and common system information, the UE has to make a determination of what system information to employ to most effectively communicate in the communication system. This, of course, may depend on many factors including, without limitation, operator policies, UE capabilities, subscription data, or design choices specified in the Third Generation Partnership Program ("3GPP") standard or the like.

For 5$^{th}$ Generation/New Radio (5G/NR) communication systems being discussed within 3GPP, in addition to the traditional periodic broadcasting of SI in cells, the concept of on-demand delivery of SI is being considered. One way of using on-demand SI is that an on-demand SI delivery request may trigger the broadcast of additional SI in one or more of periodically recurring preconfigured occasions (and/or resources). This way of using on-demand delivery is intended to be used by UEs in idle/inactive state, wherein the request/trigger may have the form of a dedicated preamble (i.e., similar or identical to a random access preamble). An alternative to the simple preamble based SI request is that the request is achieved through a three-way message exchange consisting of a random access preamble transmission from the idle/inactive UE, a random access response from the network (e.g. gNB) followed by an explicit request message (e.g., an "incomplete" random access procedure without contention resolution, where the request, possibly with elaborating details such as requested parts of the available on-demand SI, with the request included in what is commonly referred to as message 3 (Msg 3) of the random access procedure).

Another way of using on-demand SI delivery is that an on-demand SI delivery request triggers a response dedicated for the requesting UE. This variant could be designed to be used by UEs in either (or both) of idle/inactive state or connected/active state. In the former case, the request/trigger may be a dedicated preamble, just like in the case of triggering the broadcast of additional SI, and in this case the gNB/TRP may respond immediately (or in periodically recurring preconfigured occasions and/or resources as above) and may beamform the response in the direction of the requesting UE (based on directional reciprocity in the gNB/TRP or based on the PRACH resources and/or preamble used for the request transmission). In the latter case, where the requesting UE is in connected/active state (e.g., RRC_CONNECTED state in 5G/NR), the UE could send a, potentially detailed and fine granular SI request in the form of a RRC message and the gNB/network would respond with a RRC message addressed to the requesting UE (see FIG. 4).

A way to accommodate on demand SI together with more traditional broadcast of SI is to divide the SI into two parts, where one part is periodically broadcast and the other part is made available on demand. In 5G/NR the SI is divided into "minimum SI" and "other SI". The minimum SI is periodically broadcast (in the form of a Master information Block, MIB, and System Information Block type 1, SIB1). The System Information Blocks (SIBs) belonging to the "other SI" may be either periodically broadcast or made available on demand. All of the "other SI" may be either periodically broadcast or made available on demand or parts of it may be periodically broadcast while the remaining parts are made available on demand (see FIG. 5).

Accordingly, what is needed is a system, wireless device, network node, method, etc. for managing dedicated and common system information in a communication system.

SUMMARY

An object of embodiments herein is to provide a way to manage dedicated and common system information. In accordance with particular embodiments, a method for managing dedicated and common system information includes receiving a first message comprising a first set of parameters associated with system information. The first set of parameters have a first validity. The method also includes deriving a stored set of parameters based, at least in part, on the first set of parameters and its associated validity. The method additionally includes receiving a second message comprising a second set of parameters associated with system information. The second set of parameters have a second validity. The method further includes, upon the second validity superseding the first validity, modifying the stored set of parameters.

In accordance with some embodiments, the first message comprises dedicated system information and the second message comprises common system information. In some of these embodiments, the second set of parameters is a system information block and the second message contains zero or more additional system information blocks.

In accordance with certain embodiments, the first message comprises common system information and the second message comprises dedicated system information. In some of these embodiments the first set of parameters is a system information block and the first message contains zero or more additional system information blocks.

In accordance with some embodiments the first validity is based on a first validity indication and the second validity is based on a second validity indication. The method further includes comparing the first validity indication with the second validity indication to determine if the second validity supersedes the first validity. In some of these embodiments, the first validity indication comprises a first version indicator and the second validity indication comprise a second version indicator. In such embodiments, the second validity supersedes the first validity upon the second version indicator comprising a later version than the first version indicator.

In accordance with certain embodiments, at least one of the first validity or the second validity has a timer associated therewith. In such embodiments, the method further includes determining whether the timer has expired to determine if the second validity supersedes the first validity.

In accordance with some embodiments, the method may comprise modifying the stored set of parameters based on one or more modifications selected from the group consisting of: replacing a parameter in the stored set of parameters with a corresponding parameter from the second set of parameters; adding a parameter from the second set of parameters to the stored set of parameters; or removing a parameter from the stored set of parameters based on information contained in the second set of parameters.

In accordance with particular embodiments, a user equipment (UE) for managing system information includes interface circuitry configured to receive a first message comprising a first set of parameters associated with system information. The first set of parameters may have a first validity. The UE may also include processing circuitry coupled to the interface circuitry. The processing circuitry may be configured to derive a stored set of parameters based, at least in part, on the first set of parameters and its associated validity. The interface circuitry may be further configured to receive a second message comprising a second set of parameters associated with system information. The second set of parameters may have a second validity. Upon the second validity superseding the first validity, the processing circuitry is configured to modifying the stored set of parameters. The UE may also include power circuitry configured to provide power to the processing circuitry and the interface circuitry.

In accordance with particular embodiments, a wireless device for managing system information includes logic encoded in a non-transitory computer readable medium. The wireless device also includes a processor configured to execute the logic. When executed, the logic causes the wireless device to receive a first message comprising a first set of parameters associated with system information. The first set of parameters may have a first validity. The logic may also cause the wireless device to derive a stored set of parameters based, at least in part, on the first set of parameters and its associated validity. When executed, the logic may also cause the wireless device to receive a second message comprising a second set of parameters associated with system information. The second set of parameters may have a second validity. Upon the second validity superseding the first validity, the logic may case the wireless device to modify the stored set of parameters.

In accordance with particular embodiments, a system for managing dedicated and common system information includes a network node configured to transmit a first message comprising a first set of parameters associated with system information. The first set of parameters may have a first validity. The system also includes a user equipment configured to receive the first message. The user equipment is further configured to derive a stored set of parameters based, at least in part, on the first set of parameters and its associated validity. The network node of the system may be further configured to transmit a second message comprising a second set of parameters associated with system information. The second set of parameters may have a second validity. The user equipment of the system may be further configured to receive the second message. Upon the second validity superseding the first validity, the user equipment may be configured to modify the stored set of parameters.

Advantageously one or more embodiments provide the ability to modify all, some, or none of the parameters of system information. This may allow the network to provide UE specific system information. This may, in turn, allow for differentiation or separation of UEs, based on various aspects. It is to be noted that any feature of any of the above embodiments may be applied to any other embodiment, wherever appropriate. Likewise, any advantage of any of the embodiments may apply to the other embodiments, and vice versa. Other objectives, features and advantages of the enclosed embodiments will be apparent from the following detailed disclosure, attached claims, and drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Particular embodiments are now described, by way of example, with reference to the accompanying drawings, in which:

FIG. 1 illustrates a communication system in accordance with particular embodiments;

Corresponding numerals and symbols in the different figures generally refer to corresponding parts unless otherwise indicated, and may not be redescribed in the interest of brevity after the first instance.

DETAILED DESCRIPTION

Some of the embodiments contemplated by the claims will now be described more fully hereinafter with reference to the accompanying drawings. Other embodiments, however, are contained within the scope of the claims and the claims should not be construed as limited to only the embodiments set forth herein; rather, these embodiments are provided by way of example so that this disclosure will be thorough and complete, and will fully convey the scope of the inventive concept to those skilled in the art. Like numbers refer to like elements throughout the description. While the principles will be described in the environment of a Third Generation Partnership Program ("3GPP") communication system, any environment such as a Wi-Fi wireless communication system is well within the broad scope of the present disclosure.

Figure 3:
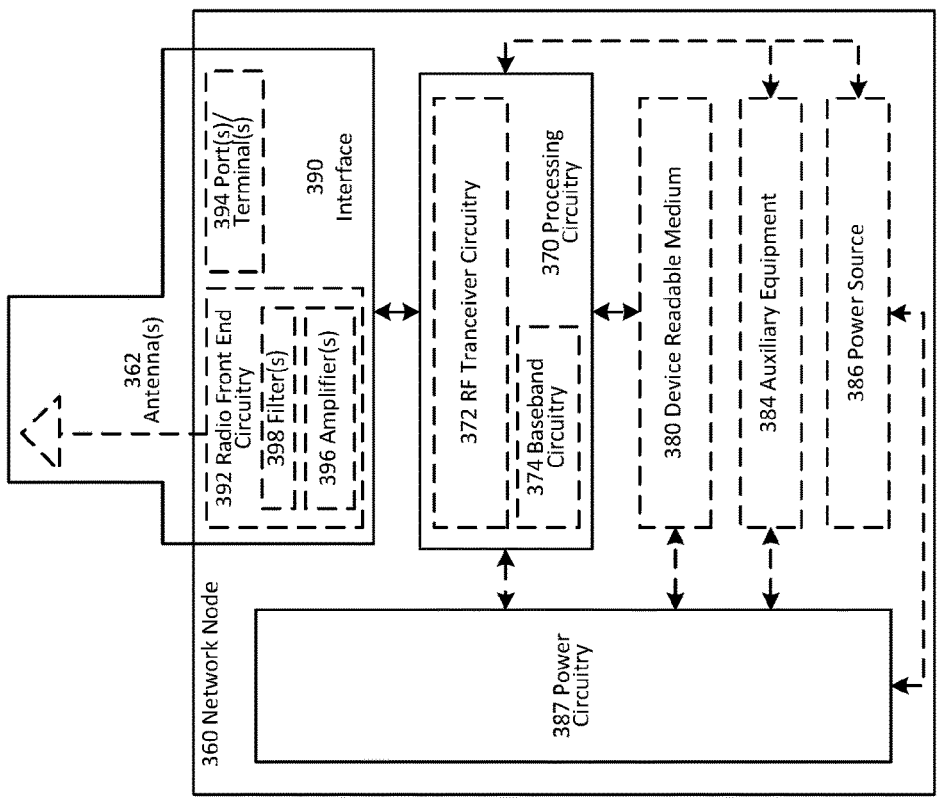
FIG. 3 illustrates a network node in accordance with particular embodiments.
Figure 2:
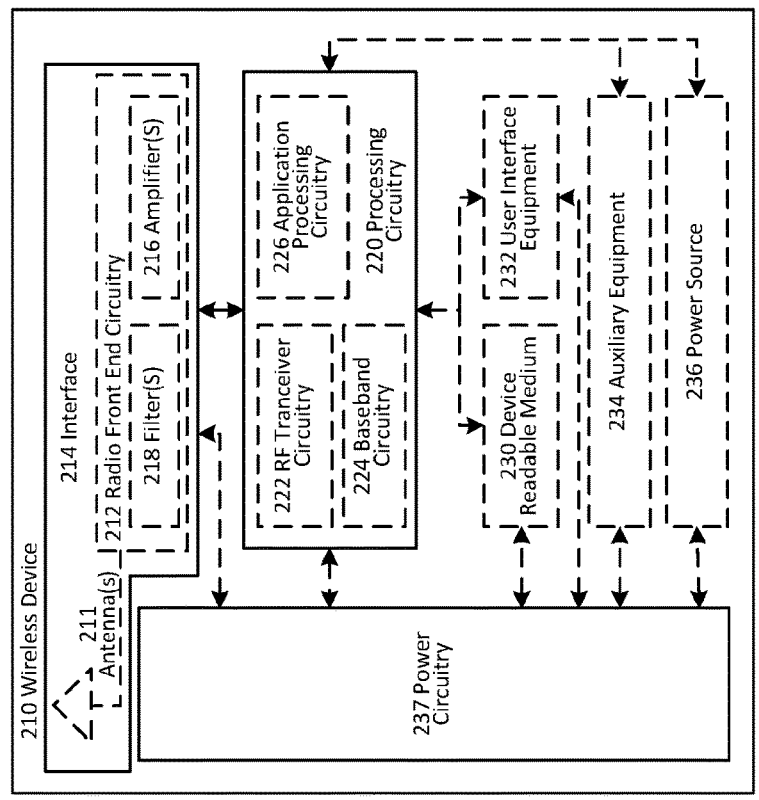
FIG. 2 illustrates a wireless device in accordance with particular embodiments.

Referring initially to FIGS. 1 to 3, illustrated are diagrams of embodiments of a communication system, and portions thereof. FIG. 1 illustrates a communication system in accordance with particular embodiments. As shown in FIG. 1, the communication system includes one or more instances of wireless communication devices or wireless devices for short (one of which is designated 110). A wireless device may be user equipment ("UE"). In some instances, a wireless device may be a particular type of UE such as machine type communication ("MTC") UE or a machine-to-machine ("M2M") UE. The communication system also includes one or more radio access nodes or network nodes (one of which is designated 120). The network nodes may be eNodeBs, gNBs or other base stations capable of communicating with the wireless communication devices 110 along with any additional elements suitable to support communication between wireless communication devices 110 or between wireless communication device 110 and another communication device (such as a landline telephone). Although the illustrated wireless communication devices 110 may represent communication devices that include any suitable combination of hardware and/or software, the wireless communication devices 110 may, in particular embodiments, represent devices such as the example wireless communication device illustrated in greater detail by FIG. 2. Similarly, although the illustrated radio access node 120 may represent network nodes that include any suitable combination of hardware and/or software, these nodes may, in particular embodiments, represent devices such as the example radio access node illustrated in greater detail by FIG. 3.

Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network.

FIG. 2 illustrates a wireless device in accordance with particular embodiments. A wireless device (WD) may refer to a device capable, configured, arranged and/or operable to communicate wirelessly with network nodes and/or other wireless devices. Unless otherwise noted, the term WD may be used interchangeably herein with user equipment (UE). Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, push to talk communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation.

As shown in FIG. 2, the example wireless communication device includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, WiFi, WiMAX, or Bluetooth wireless technologies, just to mention a few. These wireless technologies may be integrated into the same or different chips or set of chips as other components within WD 210. In certain embodiments, some or all of the functionality described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally. Alternative embodiments of the wireless communication device may include additional components beyond those shown in FIG. 2 that may be responsible for providing certain aspects of the device's functionality, including any of the functionality described above and/or any functionality necessary to support the solution described herein.

Processing circuitry 220 may be implemented with one or a plurality of processing devices. Processing circuitry 220 may perform functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. Processing circuitry 220 may be of any type suitable to the local application environment. Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments, processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. Device readable medium 230 may be operable to store a computer program, software, an application including one or more of logic, rules, code, tables, data, instructions etc. that may be used by processing circuitry 220. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof. In some embodiments, processing circuitry 220 and device readable medium 230 may be considered to be integrated.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc.

The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any conditioning, converting, or other modification to the power to or from power source 236 to make the power suitable for the respective components of WD 210 to which the power is supplied.

FIG. 3 illustrates a network node in accordance with particular embodiments. A network node may refer to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As shown in FIG. 3, the example network node includes processing circuitry 370, device readable medium 380, interface 390, auxiliary equipment 384, power source 386, power circuitry 387, and antenna 362. Although network node 360 illustrated in the example wireless network of FIG. 3 represents a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules). Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

In particular embodiments, some or all of the functionality described herein may be provided by a base station, a node B, an enhanced node B, a base station controller, a radio network controller, a relay station and/or any other type of network node may be provided by processing circuitry 370 executing instructions stored on a computer-readable medium, such as memory 380 shown in FIG. 3. Alternative embodiments of the radio access node may include additional components responsible for providing additional functionality, including any of the functionality identified above and/or any functionality necessary to support the solution described herein.

Processing circuitry 370 may be implemented with one or a plurality of processing devices. Processing circuitry 370 may perform functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units Device readable medium 380 may be one or more memories and of any type suitable to the local application environment and that may store information, data, and/or instructions that may be used by processing circuitry 370. Device readable medium 380 may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable network node 360 to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signaling and/or data between network node 360, a backhaul network (e.g., network 130), and/or WDs (e.g., WDs 140). As illustrated, interface 390 comprises port(s)/terminal(s) 394 to send and receive data, for example to and from the network over a wired or wireless connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 100 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

For a Fifth Generation ("5G")-New Radio ("NR") communication system, in addition to the periodic broadcasting of system information ("SI") within cells, the concept of on-demand delivery of system information is being considered. An on-demand SI delivery request may trigger the broadcast of additional SI in one or more periodically recurring preconfigured occasions (and/or resources). This methodology of on-demand delivery may be used by WDs such as WD 210 (also referred to as UEs) in an idle/inactive state, wherein the request/trigger may be in the form of a dedicated preamble (e.g., similar or identical to a random access preamble). In addition to the preamble-based SI request, the SI request may be achieved through a three-way message exchange including a random access preamble transmission from WD 210 when in an idle/inactive state, a random access response from network node 360 (e.g., a gNB, a base station in 3GPP NR standardization work), and followed by an explicit request message (i.e., an "incomplete" random access procedure without contention resolution). The request may elaborate on details, such as requested parts of the available on-demand SI and may be included in a Message 3 of the random access procedure.

The on-demand SI delivery request may also trigger a response dedicated for the requesting WD 210. This variant may be designed to be used by WDs in either (or both) of idle/inactive state or connected/active state. In the former case, the request/trigger may be a dedicated preamble, just like in the case of triggering the broadcast of additional SI and, in this case, the network node transmission and reception point ("TRP") may respond immediately (or in periodically recurring preconfigured occasions and/or resources as above) and may beamform the response in the direction of the requesting UE (based on directional reciprocity in the gNB/TRP). In the latter case, the UE may send a potentially detailed and finer SI request in the form of a radio resource control ("RRC") message and the gNB may respond with a RRC message addressed to the requesting UE.

Figure 4:
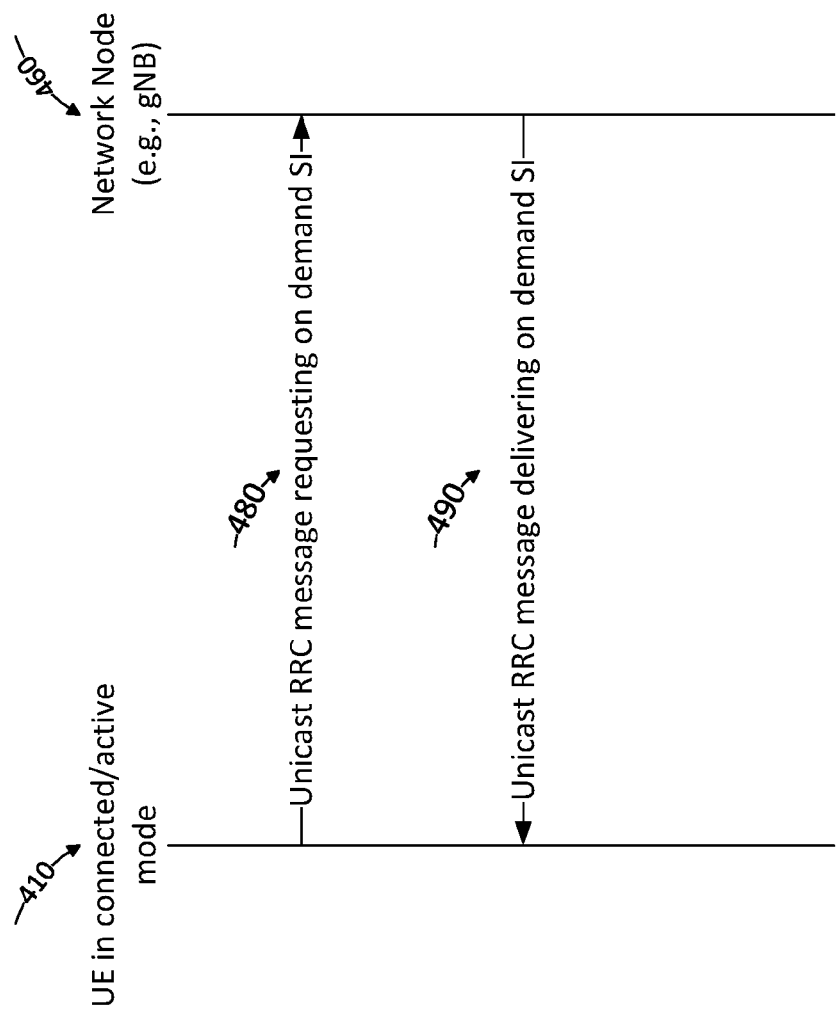
FIG. 4 illustrates an exchange of signals requesting on-demand system information.

Turning now to FIG. 4 there is illustrated an exchange of signals requesting on-demand system information. The exchange may be used in connection with on-demand SI delivery. UE in connected/active mode 410 transmits unicast RRC message 480 to network node 460 (e.g., a gNB) requesting on-demand SI. In response thereto, network node 460 transmits unicast RRC message 490 delivering the on-demand SI. Unicast RRC message 490 may replace some or all of the SI UE 410 has received from broadcasts in the cell. The broadcast SI may also be referred to as "common SI" since it reaches and concerns a plurality of UEs. The unicast SI may also be referred to as "dedicated SI" or "on-demand SI." Unicast RRC message 490 may include UE-specific or UE-group specific SI. This allows differentiation or separation of UEs, based on various aspects.

Figure 5:
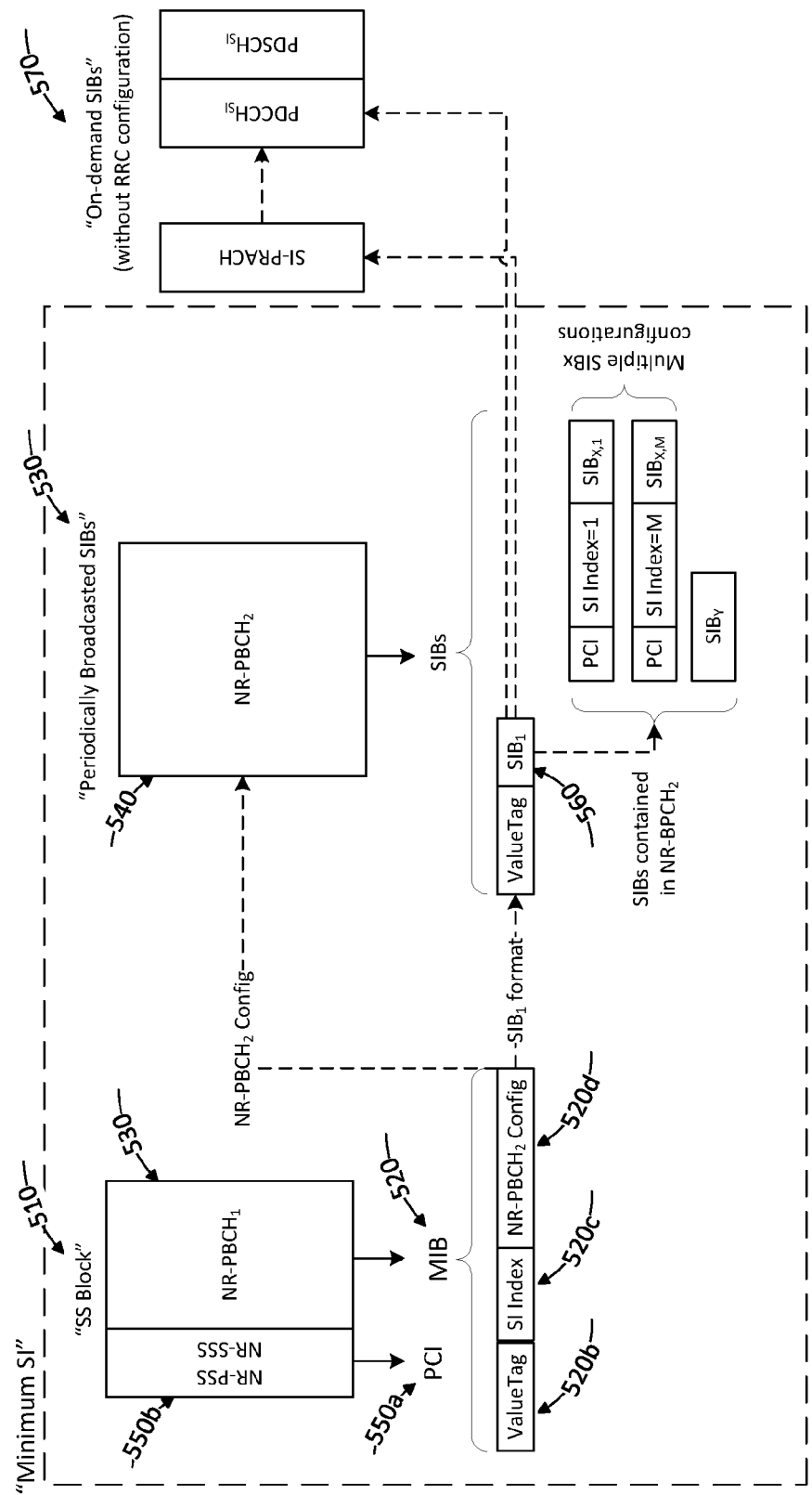
FIG. 5 illustrates a breakdown of system information provided in part through periodic broadcasts and in part through on-demand requests.

FIG. 5 illustrates a block diagram of an embodiment of a structure of system information in a communication system. The physical cell identity ("PCI") 550*a* is signaled by the index of a NR-primary synchronization signal/NR-secondary synchronization signal ("NR-PSS/NR-SSS") 550*b*; a master information block ("MIB") 520 is signaled in a first broadcast channel denoted NR-physical broadcast channel (referred to as "NR-PBCH1") 530; and the periodically broadcasted system information blocks ("SIBs") 550 are signaled in a second broadcast channel denoted NR-PBCH2 540. Note that the second broadcast channel, NR-PBCH$_2$, may be realized as a control-data-channel pair in a PDCCH+PDSCH-like fashion. Of course, additional information fields may be included as well. The synchronization signal ("SS") block 510 provides PCI 550*a* and MIB 520. MIB 520 contains at least valueTag 520*b*, SI index 520*c*, and configuration information 520*d* enabling the UE to receive periodically broadcast SIBs 530 on NR-PBCH2 540. SI index 520*c* may be interpreted as selecting which configuration in SIB that shall apply to each beam. This enables different beams to use different parameter configurations. For example, different beams may have different physical random access channel ("PRACH") time slots and/or different PRACH preamble sequences. FIG. 5 illustrates a realization of periodically broadcast SI 530 and on-demand (dedicated) SI 570 delivery when triggered by a request from a UE in a communication system. For a better understanding of the structure of system information, see U.S. Patent Application Ser. No. 62/418,162, entitled "System and Method for Encoding System Information for Multiple Cells and Beams," filed on Nov. 4, 2016, which is incorporated herein by reference.

In some embodiments, the broadcast SI parameters may be collected in SIBs (a certain parameter can belong to only one SIB and which one it belongs to may be specified in, for example, in a standard). Hence, an SIB may be considered a set of parameters. Furthermore, the set of parameters provided via dedicated (RRC) signaling (i.e. the dedicated SI), may be a complete SIB (or multiple SIBs) or may contain only parts of the parameters of a SIB (or parts of multiple SIBs) (e.g. only those parameters which have values overriding the corresponding broadcast parameters).

Discussed in more detail below, are various embodiments in which a UE or WD manages the SI when it receives dedicated SI and common SI (with other parameter values, i.e., a different configuration) broadcast from a radio access node. The embodiments can be applied irrespective of whether the UE remains in connected/active state or switches to idle/inactive state.

In one embodiment, network node 460 ties the validity of the dedicated SI to a validity indicator (e.g., a version number) of a common SI. Under this scenario, the dedicated SI is valid until the validity indicator indicates that the common SI has changed or is no longer valid. When this happens, UE 410 acquires an updated common SI and modifies (e.g., supplements, replaces, discards, etc.) the previously received dedicated SI. This embodiment can be extended to multiple validity indications, each tied to a separate part of the common SI. In other embodiments, the validity of the dedicated SI is associated with a validity time such as a time to live timer (upon whose expiration the UE should acquire the common SI) or is defined to be valid until further notice.

As a result, a void in the treatment of dedicated SI in relation to corresponding common SI with respect to the UE behavior is filled. Certain embodiments disclosed herein provide a way for the network to configure the UE to behave in accordance with different principles depending, without limitation, on operator policies, UE capabilities, subscription data, or design choices specified in the 3GPP standard. In some scenarios, it may be convenient to refer to stored SI. Stored SI may comprise, for example, the set of currently active SI parameters. Stored SI may comprise common SI, dedicated SI, or a mix, as the case may be.

Some embodiments disclosed herein provide a mechanism to manage system information when common SI is broadcast and acquired by the UE, and may be modified by dedicated SI (e.g., UE specific or UE group specific SI) provided to the UE through unicast messaging. The system information may be based on, without limitation, UE category/capabilities, subscription information, quality of service ("QoS") of the UE's bearers/flows, awareness of applications running on the UE, and battery status. Certain embodiments disclosed herein may also apply to the case where the UE receives the dedicated SI, but may later receive the common SI via broadcast. Some embodiments can be applied irrespective of whether the UE, after receiving the dedicated SI, remains in connected/active state or switches to idle/inactive state.

There are different ways to deal with the situation wherein the UE receives the dedicated SI, and thereafter receives the common SI. First, the UE may continue using the previously stored dedicated SI (e.g., UE or UE group-specific). Alternatively, the UE may modify a previously stored dedicated SI with the common SI. Hybrids of these two approaches are also possible such as replacing some of the parameters of the dedicated SI, but retaining others. The radio access node (e.g., gNB) or network, in general, may maintain control of the UE with respect to the treatment of the dedicated and common SI via validity instructions.

In one embodiment, the gNB ties (or associates) the validity of the dedicated SI to a validity indicator (e.g., a version number) of the common SI. Typically, this means that the gNB instructs the UE to regard the dedicated SI as valid as long as the common SI it replaces remains unchanged, as indicated by the validity indicator associated with the common SI (e.g., broadcast together with the common SI or separately). As soon as the common SI changes, as indicated by its associated validity indicator, the UE may acquire and apply the updated common SI and invalidate and preferably, but not necessarily, discard the previously stored dedicated SI. To support this approach, the network may transfer the validity indicator to the UE together with the dedicated SI, but, alternatively, the network may provide the validity indicator as part of broadcast transmissions or the validity indicator may be preconfigured or stored by the UE (e.g., a preconfigured timer).

In some embodiments, there may be multiple validity indications, each associated with a different part of the common SI. In some embodiments, the multiple validity indications may comprise per SIB ValueTags. In some scenarios, the multiple validity indications or per SIB ValueTags may be considered a validity indicator. When considering the validity of (and how to deal with) the stored dedicated SI, the UE may check the validity indication(s) of the broadcast common SI section(s) corresponding to the dedicated SI. The different system information sections may be considered separately and modified separately, as mandated by the respective validity indication(s) or instructions. As above, the network may include the validity indicators when sending the dedicated SI to the UE, or as part of a broadcast message(s).

In another embodiment, the network (when transferring the dedicated SI to the UE) associates a validity timer such as a time to live timer with the dedicated SI and instructs the UE to regard the dedicated SI as valid until the time to live timer expires. At that point, the UE may use the common SI (i.e., either acquire it or use already acquired and stored common SI), unless the network provides the UE with another dedicated SI or refreshes the previous dedicated SI (e.g., resets the time to live timer). The time to live timer or indication may be transferred to the UE together with the dedicated SI, provided in the common SI via a broadcast message, or specified in a standard.

In yet another embodiment, the network may instruct the UE that the dedicated SI should be valid until further notice, irrespective of changes to the common SI. In some embodiments this may be done by, in essence, setting the time to live timer to infinity. The above described embodiments may be used in parallel and, in such a case, the configuration of the UE may depend on operator policies, UE capabilities, subscription data, QoS of the UE's bearers/flows, awareness of applications running on the UE, battery status, etc.

The above described embodiments may also be combined in various ways such as configuring the dedicated SI to depend on a validity indication associated with the common SI as well as on a time to live timer. That is, the UE may regard the dedicated SI as valid until the concerned validity indication changes or the time to live timer expires, whichever happens first. The validity of the dedicated SI can also be tied to an SI index as part of a synchronization signal ("SS") and system information block ("SIB") configuration to be applied in the cell (see FIG. 5). With this approach, the dedicated SI would be invalidated if the SI index in the synchronization signal is changed. The validity rule may be, for instance, that the dedicated SI is valid as long as the SI index is one out of a set of SI indexes (including the current one).

In another embodiment, the periodically broadcast common SI may include an additional parameter explicitly controlling the validity of the common and/or dedicated SI. The common SI may contain two validity indicators (e.g., valueTags), one for the common SI (common validity indicator) and another validity indicator for any dedicated SI (dedicated validity indicator). When the network configures a UE with the dedicated SI, it links the validity of this dedicated SI to the currently broadcast dedicated validity indicator. The UE shall then invalidate the dedicated SI and replace it with the corresponding common SI when the dedicated validity indicator changes and shall ignore the corresponding common SI, regardless of the value of the common validity indicator, as long as the dedicated validity indicator remains unchanged.

With continuing reference to FIG. 5, in the case that the common validity indicator is transmitted in a master information block ("MIB") 520 on a first channel (e.g., a first physical broadcast channel such as NR-Physical Broadcast Channel 1 ("NR-PBCH$_1$")) 530 and the dedicated validity indicator is transmitted on a second channel (e.g., in the SIBs belonging to the minimum SI on a second physical broadcast channel, NR-PBCH$_2$) 540, then the common validity indicator (which is affected by updates of the entire content of the minimum SI) will also cover the dedicated validity indicator, which means that a change of the dedicated validity indicator will cause a change of the common validity indicator. Hence, a UE that is configured with dedicated SI will read the second physical broadcast channel 540 whenever the common validity indicator (e.g., ValueTag 520b) is changed to determine if the dedicated validity indicator is changed. In some embodiments, the common validity indicator may be broadcast in SIB1 560. As an alternative to introducing a dedicated validity indicator, the periodically broadcast common SI could contain a flag indicating whether the present version of the common SI (as indicated by the validity indicator) should override dedicated SI associated with previous values of the validity indicator. Note that the second broadcast channel, NR-PBCH$_2$ may be realized as a control-data-channel pair in a PDCCH+PDSCH like fashion.

In some embodiments, when the UE returns to a cell after having been connected to another cell (e.g., after a ping-pong handover), the treatment of the dedicated SI can be managed as set forth below. The network may configure the UE to let the validity conditions remain unaffected by such an event. That is, if the invalidation conditions (e.g., change of validity indication or expiration of time to live timer) have not been triggered, the UE should still regard the stored dedicated SI as valid when returning to the cell in which the dedicated SI was obtained. Alternatively, the network may configure the UE to discard/invalidate the stored dedicated SI as soon as it connects to another cell.

Furthermore, the validity of the common and dedicated SI may depend on the state of the UE. As an option, the network may configure the dedicated SI to either be invalidated (and replaced by common SI) when the UE moves to an idle/inactive mode or kept valid, unaffected by a switch from the connected/active to the idle/inactive mode. The treatment of the common and dedicated SI may be in terms of a set of cells or other area. A first case is that the dedicated SI is valid only in the cell in which it is transferred to the UE. The validity scope, however, may also be a list of cells (potentially even excluding the cell in which it is transferred to the UE), cells served by a certain gNB (e.g., defined by a gNB identifier), a radio access network paging area (i.e., an area/set of cells used for radio access network internal paging of a UE in the "new NR state", tentatively denoted inactive state), or a tracking area. In some cases, the network may configure the validity scope to be one or more cells other than the cell where the dedicated SI is transferred to the UE, i.e., excluding the cell where the dedicated SI is obtained. In such a case, the network may provide the UE two dedicated SI, one valid for the cell that provided the dedicated SI and the other valid for the other cells. It is also possible to provide a list of dedicated SI to the UE that are valid for selected cells. The validity rules as between common and dedicated SI may apply as well.

Figure 6:
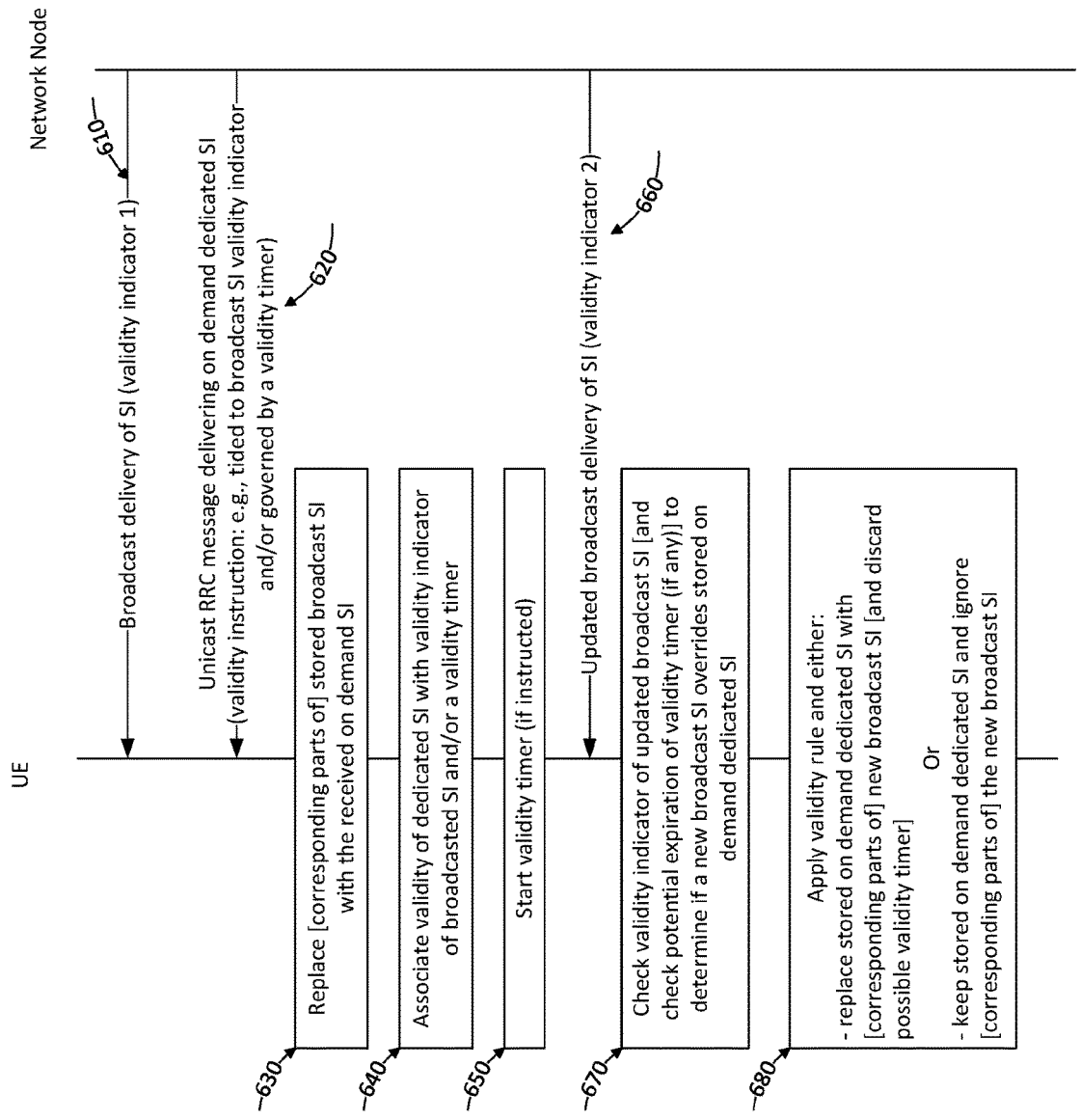
FIG. 6 illustrates an exchange of signals in accordance with particular embodiments.

Turning now to FIG. 6, there is a signaling diagram that illustrates an exchange of signals in accordance with particular embodiments. The network node initially broadcasts a first common SI (including a first validity indicator) with broadcast SI 610. Broadcast SI 610 contains and initial validity indicator 1. The network node then unicasts an RRC message 620. Unicast message 620 may deliver on-demand dedicated SI. The on-demand dedicated SI may include validity instructions. For example, it may associate the validity of the SI to a validity timer, a validity indicator, or the like. There may be additional, unrelated messages (not illustrated) sent between broadcast SI 610 and unicast message 620. The UE (in connected/active mode) then modifies corresponding parts of the stored SI (e.g., the common SI received in broadcast SI 610) with the received on-demand dedicated SI (received in unicast message 620) at 630. At 640, the UE associates the validity of dedicated SI with the validity indicator of the broadcasted first common SI and/or the validity timer. The association may be such that both the broadcast SI and the dedicated SI expire under the same conditions or under separate conditions. For example, the dedicated SI may have a validity timer associated with it, while the broadcast SI may be tied to a validity indicator. If instructed, or needed, the UE starts a validity timer at 650. The validity timer may be associated with the broadcast SI, the dedicated SI, or both. In some embodiments the broadcast SI and the dedicated SI may have separate timers associated therewith.

The network node then broadcasts updated delivery of a second or updated common SI at 660. The second common SI includes a second or updated validity indicator. At 670, the UE checks the second validity indicator of the updated broadcast second common SI and compares it to the existing validity indicator or indicators. In some embodiments, at 670, the UE may also check for the potential expiration of a validity timer (if any) to determine if the second common SI overrides the stored on-demand dedicated SI. The UE then applies a validity rule and, depending on the scenario, modifies the stored on-demand dedicated SI with the corresponding parts of the broadcast second common SI; keeps the on-demand dedicated SI that was previously stored and ignores the corresponding parts of the broadcast second common SI; or supplements the stored on-demand dedicated SI with the second common SI at 680. In some embodiments, the validity timer may be reset or discarded.

Figure 7:
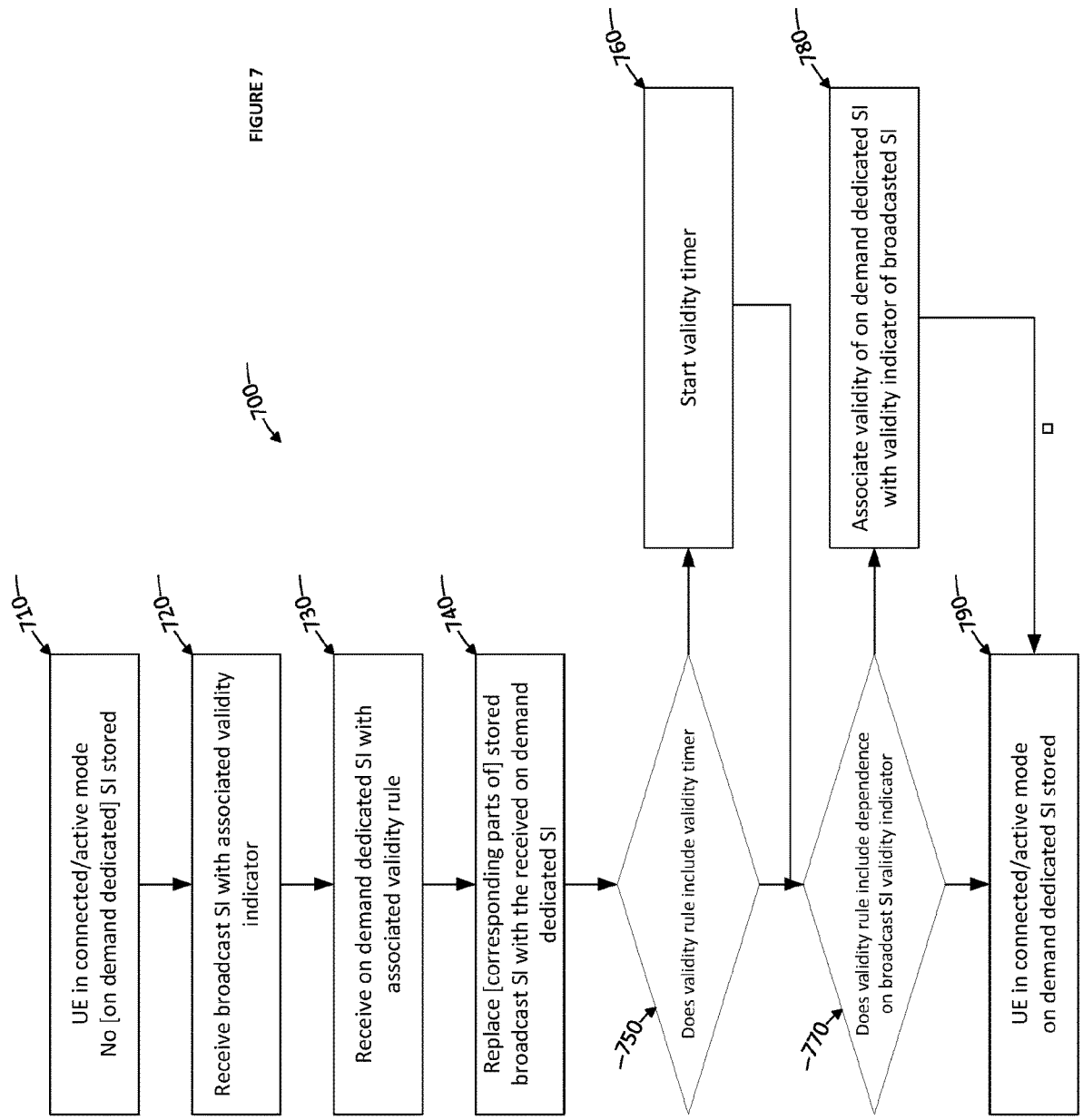
FIG. 7 illustrate a method in accordance with particular embodiments.

Turning now to FIG. 7, there is illustrated a method in accordance with particular embodiments. The method 700 begins at step 710 with a UE being in a connected/active mode, and an on-demand dedicated SI having not been initially stored therein. At step 720, the UE receives a broadcasted common SI with an associated validity indicator. At step 730, the UE then receives on-demand dedicated SI with an associated validity rule. At step 740 the UE replaces (corresponding parts of) the stored broadcast common SI with the received on-demand dedicated SI. In some embodiments, this replacement may be temporary as the UE works through the remaining steps to determine if the dedicated SI is valid.

At decision step 750, the UE assesses if the validity rule includes a validity timer. If the validity rule does not include a validity timer, the method continues to the next step, otherwise, if the validity rule includes a validity timer, the UE starts the validity timer at step 760. At decision step 770, the UE assesses if the validity rule includes dependence on a broadcast common SI validity indicator. If the validity rule includes dependence on a broadcast common SI validity indicator, the UE associates the validity of the on-demand dedicated SI with a validity indicator of broadcasted common SI at step 780. Then the UE in the connected/active mode (e.g., RRC_CONNECTED state in 5G/NR) stores the on-demand dedicated SI at step 790.

Figure 8:
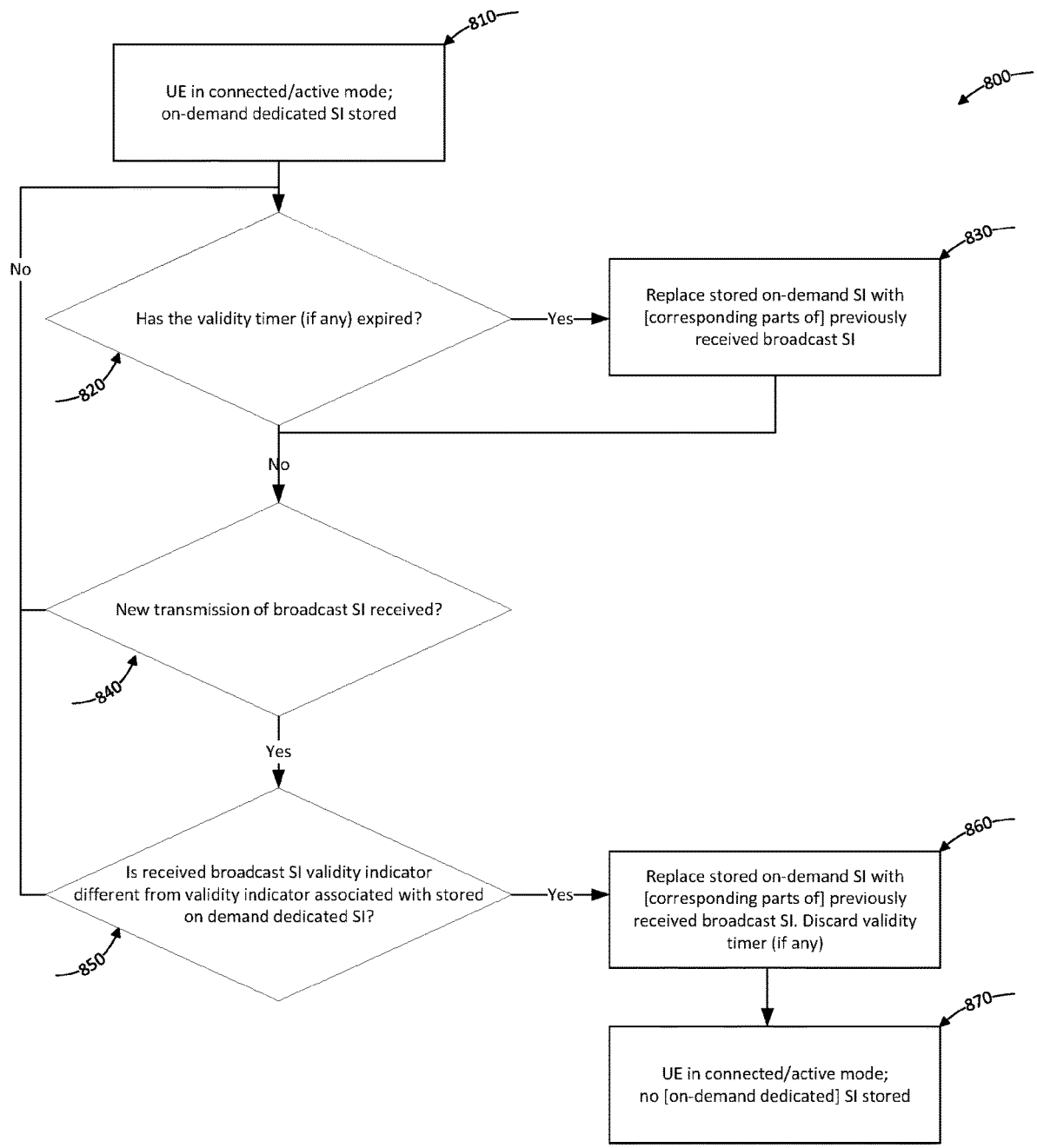
FIG. 8 illustrate a method in accordance with particular embodiments.

Turning now to FIG. 8, there is illustrated a method in accordance with particular embodiments. The method 800 begins at step 810 with a UE being in a connected/active mode, and an on-demand dedicated SI with corresponding validity indicator having been stored therein. At decision step 820, the UE assesses if a validity timer (if any) has expired. If the validity timer has expired, then at step 830 the UE replaces the stored on-demand SI with (corresponding parts of) previously received broadcast common SI. Otherwise or following the previous step, at decision step 840, the UE assesses if a new transmission of a broadcast common SI has been received.

If a broadcast common SI has not been received, the method 800 returns to decision step 820. If the UE determines that a new transmission of broadcast common SI has been received, the method 800 continues to decision step 850. At decision step 850, the UE applies a rule to the validity indicators for the treatment of the common and dedicated SI. For instance, the UE determines if a received broadcast common SI validity indicator is different from a validity indicator associated with the stored SI. If a validity indication is not different, the method 800 returns to decision step 820. If a validity indication is different, the UE replaces stored on-demand dedicated SI with (corresponding parts of) previously received broadcast common SI, and discards a validity timer (if any) at step 860. The method ends at step 870 with the UE in the connected/active mode with no on-demand dedicated SI stored.

Figure 9:
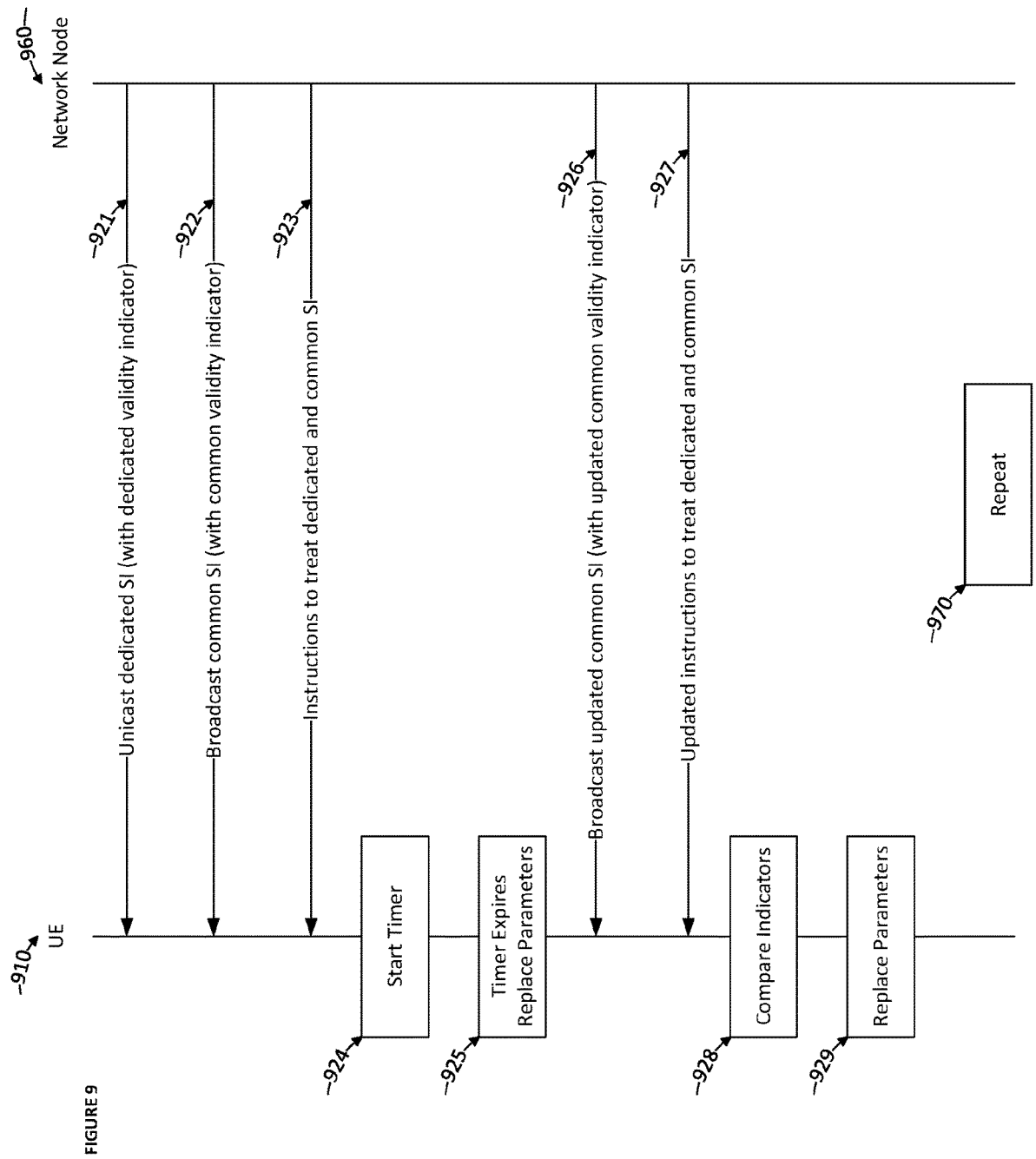
FIG. 9 illustrates an exchange of signals in accordance with particular embodiments.

Turning now to FIG. 9 there is illustrated an exchange of signals in accordance with particular embodiments. In this figure, network node 960 (e.g., a gNB) sends unicast SI 921 in an RRC message. Unicast Si 921 delivers to UE 910 dedicated SI including a dedicated validity indicator. Network node 960 then broadcasts a common SI including a common validity indicator at step 922. Then at step 923, network node 960 provides UE 910 with instructions on how to treat the dedicated and common SI. In accordance with the instructions, and assuming the UE employs parameters of the common SI, UE 910 starts a validity timer at step 924. When the timer expires, UE 910 replaces parameters of the common SI with corresponding parameters of the dedicated SI at step 925.

Network node 960 then broadcasts an updated common SI including an updated common validity indicator at step 926 and provides updated instructions to treat the dedicated and updated common SI at step 927. In accordance with the instructions and assuming the UE employs parameters of the dedicated SI, UE 910 compares the dedicated validity indicator to the updated common validity indicator to determine a treatment of the parameters of the dedicated SI and the updated common SI at step 928. The comparison may be based on different types of rules as set forth in updated instructions. For instance, the UE may replace the parameters of the dedicated SI with the corresponding parameters of the updated common SI (or vice verses) if the dedicated validity indicator is different than the updated common validity indicator at step 929. The method may then repeat as indicated by step 970. For instance, network node 960 may provide a plurality of updated common SI including corresponding updated common validity indicators to the UE, and instruct the UE to replace parameters of the dedicated SI with corresponding parameters of one of the plurality of updated common SI. As an example, UE 910 may employ the parameters of the tenth updated common SI.

Of course in any of the embodiments disclosed herein there are many rules that can be applied to the validity indicators. As an example, a rule may be that common validity indicators (also referred to as "valueTag_c") larger than M (e.g., M=1000) overrides any dedicated validity indicators (also referred to as "valueTag_d"), and any common validity indicators smaller than M indicates to the UE that the dedicated SI is still valid.

Another rule may be that the UE replaces the dedicated SI with the common SI if the common validity indicator is greater than the dedicated validity indicator plus a variable "N". In such a case, the network may update the common SI (and the associated common validity indicator) up to N times (e.g., N=5) without forcing the UE to replace the dedicated SI (associated with the dedicated validity indicator) with the new common SI. After more than N updates (and incremental updates of the common validity indicator), the UE will replace the dedicated SI with the latest version of the common SI.

Another example is to tie the validity of unicast dedicated system information, which may modify parts of the stored system information, to one or more validity indication(s) associated with the broadcast common system information, and to configure the UE to behave and manage the system information in a certain way based on possible changes in one or more of the one or more validity indication(s) and/or instructions. In addition to the logical dependence of the broadcast validity indication(s), the UE may be configured to let the validity of the unicast dedicated system information depend on a timing aspect, such as a validity timer (e.g., a time to live timer or indication). The network broadcasts the common system information and provides the unicast dedicated system information to a UE and configures the UE to manage the validity of the dedicated system information based on the validity determination. The UE receives both broadcast common system information and dedicated system information and uses one, both or portions thereof based on the validity determination.

Figure 10:
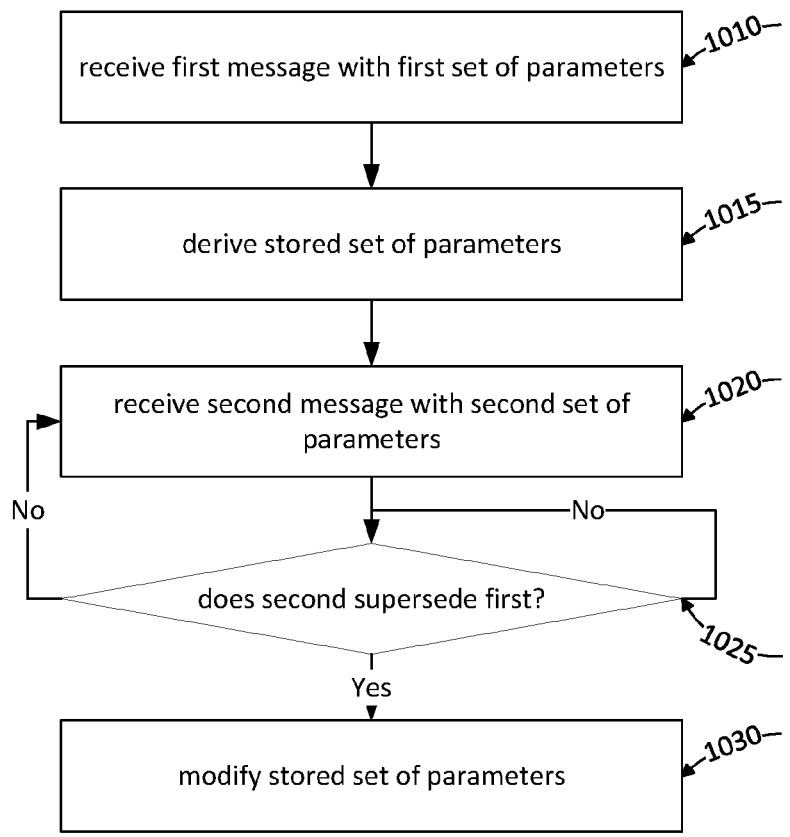
FIG. 10 illustrates a method in accordance with particular embodiments.

FIG. 10 illustrates a method in accordance with particular embodiments. The method illustrates the steps performed by a user equipment (UE). Although the steps will be described with respect to a UE, they are equally applicable to a wireless device (WD). The method begins at step 1010 with the receipt of a first message. The first message includes a first set of parameters associated with system information. Depending on the embodiment or scenario, the first message may comprise dedicated system information. For example, the first message may be addressed specifically to the UE (or to a particular group or subset of UEs to which the UE is a member). Alternatively, the first message may comprise common system information. For example, the first message may be broadcast to any or all UEs within range of the network node transmitting the first message. The first set of parameters may include a number of different system information parameters. That number may vary from all possible system information parameters to a single system information parameter. In some embodiments, the first set of parameters may comprise a system information block. In some scenarios, the first message contains zero or more additional system information blocks. A single system information block may contain a single set of parameters. A message may comprise multiple system information blocks. Thus, in some scenarios, the first set of parameters may be based on multiple sets of parameters from multiple system information blocks associated with the first message. In some scenarios, the first message may be a dedicated (RRC) message containing dedicated SI. In some embodiments, the set of parameters may be provided via dedicated (RRC) signaling (i.e., the dedicated SI, may be a complete SIB (or multiple SIBs) or may contain only parts of the parameters of a SIB (or parts of multiple SIBs), e.g. only those parameters which have values overriding the corresponding broadcast parameters).

Regardless of the type of system information (e.g., dedicated or common), the first set of parameters may have a first validity associated therewith. The validity may be any of the different types of validity discussed above with respect to any of the other embodiments. For example, in some embodiments the first validity may be based on a first validity indication (e.g., a version indicator, or an SI index). As another example, the first validity may be based on a timer (e.g., a time to live timer). In some embodiments, the timer value may be part of the first message. For example, when the first message is received, the timer is set based on a timer value within the first message. The parameters may be valid until the timer runs out. In some embodiments, the timer value may be part of a different message. For example, a set of parameters previously received in a different message may have a timer associated therewith. The first set of parameters may be valid only if the timer from the previous message expires. In some embodiments, only dedicated system information parameters may have a timer associated therewith (common system information parameters would not have a timer associated therewith).

At step 1015, a stored set of parameters are derived. The stored set of parameters may be derived based, at least in part, on the first set of parameters and its associated validity. This may occur in a number of different scenarios. For example, the UE may have just recently powered on and the first set of parameters may be the first system information parameters received by the UE. In such a scenario, the stored set of parameters may be based entirely on the first set of parameters. As another example, the UE may have been operating for some time prior to receiving the first message. In such a scenario, the first set of parameters may be added to or replace existing parameters already part of the stored set of parameters. This may be similar to the modifying step 1030 discussed in more detail below. The number of parameters of the first set of parameters may or may not equal the number of parameters of the stored set of parameters.

At step 1020, the UE receives a second message comprising a second set of parameters associated with system information. As with the first set of parameters from the first message, the second set of parameters may be associated with common system information or dedicated system information. The actual number of parameters of the second set of parameters need not equal the number of parameters of the first set of parameters. The parameters of the second set of parameters may correspond to all, some, or none of the parameters of the first set of parameters. In some embodiments, the second set of parameters may comprise a system information block. The second message may contain zero or more additional system information blocks.

Also, as with the first set of a parameters, the second set of parameters has a second validity associated therewith. In some embodiments, the second validity may be based on the first validity, or vice-versa (e.g., the second set of parameters may inherit the first validity associated with the first set of parameters). The second validity may be based on a validity indication (e.g., a version indicator or an SI index) or a timer. In some embodiments, the first and second validity may be based on multiple factors. For example, the validity of the first or second set of parameters may be based on a version indicator and a time to live timer associated with the first set of parameters, the second set of parameters, the stored set of parameters, or a combination of one or more of the sets of parameters.

At step 1025, the UE determines whether the second set of parameters supersedes the first set of parameters. This may be based on the first validity and/or the second validity. For example, in some embodiments, the UE may compare the first validity with the second validity. As a more specific example, the UE may compare the first version indicator associated with the first set of parameters with the second version indicator associated with the second set of parameters. As another example, the UE may assess a timer value associated with the first or second validity. The second set of parameters may then supersede the first set of parameters if the timer has or has not expired, as the case may be. For example, the second set of parameters may be valid as long as a timer associated with the second set of parameters has or has not expired, or as long as a timer associated with the first set of parameters has or has not expired. In some embodiments the timer may be based on a time stamp and/or a specified time (as opposed to an actual timer counting down to zero). For example, the timer may specify a particular time when the associated parameter(s) expire. Then, when a second set of parameters are received, if the associated time stamp is before the specified particular time, the first set of parameters are valid, if the time stamp is after the specified time, then the second set of parameters are valid. In some embodiments, the validity may be based on a combination of a timer and a validity indicator. For example, the first set of parameters may have a first version indicator and a first timer associated therewith. If the second version indicator precedes the first version indicator or if the timer has not expired, then the first set of parameters supersedes the second set of parameters (i.e., the second set only supersedes the first set if the timer has expired and the second version number is later than the first version number).

At step 1030, upon the second validity superseding the first validity, the UE modifies the stored set of parameters. The UE may modify the stored set of parameters in a variety of different ways. For example, in some scenarios the UE may replace one or more parameters in the stored set of parameters with corresponding parameter(s) from the second set of parameters. As another example, in some scenarios the UE may add one or more parameters from the second set of parameters to the stored set of parameters. As another example, in some scenarios the UE may remove one or more parameters from the stored set of parameters. These examples are not mutually exclusive. That is, in some scenarios, the UE may remove some parameters from the stored set of parameters, add some parameters to the stored set of parameters, and replace some parameters of the stored set of parameters. In some embodiments, each parameter of the stored set of parameters may have its own respective validity depending on the set with which it was received. For example, if the second set of parameters replaces 3 of 10 parameters in the stored set, then those 3 parameters would have the second validity while the remaining 7 parameters may have the first validity (or whatever validity was associated therewith when they were added to the stored set of parameters). In some embodiments, each parameter of the stored set of parameters may share the same validity. This may, for example, be the validity of the set that was last used to modify the stored set of parameters. The modified parameter(s) may be a parameter from the first set of parameters or it may be a parameter that was added to the stored set of parameters some other way (e.g., pre-coded or received in a different message).

As described above, the exemplary embodiments provide both a method and corresponding apparatus consisting of various functional units or modules providing functionality for performing the steps of the method. The functional units or modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although embodiments and their advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, combined, etc., and still fall within the broad scope of the various embodiments.

Moreover, the scope of the various embodiments disclosed above is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

The invention claimed is:

1. A method for managing system information, the method comprising:
receiving a first message comprising a first set of parameters associated with a first type of system information, the first set of parameters having a first validity, and the first type of system information is common system information or dedicated system information;
deriving a stored set of parameters based, at least in part, on the first set of parameters and its associated validity;
receiving a second message comprising a second set of parameters associated with a second type of system information, the second set of parameters having a second validity, and the second type of system information is common system information or dedicated system information wherein the first and second type of system information are different; and
upon the second validity superseding the first validity, modifying the stored set of parameters.

2. The method of claim 1, wherein the first type of system information is dedicated system information and the second type of system information is common system information.

3. The method of claim 2, wherein the second set of parameters is a system information block and the second message contains zero or more additional system information blocks.

4. The method of claim 1, wherein the first type of system information is common system information and the second type of system information is dedicated system information.

5. The method of claim 4, wherein the first set of parameters is a system information block and the first message contains zero or more additional system information blocks.

6. The method of claim 1:
wherein the first validity is based on a first validity indication and the second validity is based on a second validity indication; and
further comprising, comparing the first validity indication with the second validity indication to determine if the second validity supersedes the first validity.

7. The method of claim 6, wherein:
the first validity indication comprises a first version indicator and the second validity indication comprise a second version indicator; and
wherein the second validity supersedes the first validity upon the second version indicator comprising a later version than the first version indicator.

8. The method of claim 1:
wherein at least one of the first validity or the second validity has a timer associated therewith; and
further comprising determining whether the timer has expired to determine if the second validity supersedes the first validity.

9. The method of claim 1 wherein modifying the stored set of parameters comprises modifying the stored set of parameters based on one or more modifications selected from the group consisting of:
replacing a parameter in the stored set of parameters with a corresponding parameter from the second set of parameters,
adding a parameter from the second set of parameters to the stored set of parameters,
removing a parameter from the stored set of parameters based on information contained in the second set of parameters.

10. A user equipment (UE) for managing system information, the UE comprising:
- interface circuitry configured to receive a first message comprising a first set of parameters associated with a first type of system information, the first set of parameters having a first validity, and the first type of system information is common system information or dedicated system information;
- processing circuitry coupled to the interface circuitry and configured to derive a stored set of parameters based, at least in part, on the first set of parameters and its associated validity;
- wherein the interface circuitry is further configured to receive a second message comprising a second set of parameters associated with a second type of system information, the second set of parameters having a second validity, and the second type of system information is common system information or dedicated system information wherein the first and second type of system information are different;
- wherein, upon the second validity superseding the first validity, the processing circuitry is further configured to modifying the stored set of parameters;
- power circuitry configured to provide power to the processing circuitry and the interface circuitry.

11. The UE of claim 10, wherein the first type of system information is dedicated system information and the second type of system information is common system information.

12. The UE of claim 11, wherein the second set of parameters is a system information block and the second message contains zero or more additional system information blocks.

13. The UE of claim 10, wherein the first type of system information is common system information and the second type of system information is dedicated system information.

14. The UE of claim 13, wherein the first set of parameters is a system information block and the first message contains zero or more additional system information blocks.

15. The UE of claim 10:
- wherein the first validity is based on a first validity indication and the second validity is based on a second validity indication; and
- wherein the processing circuitry is further configured to compare the first validity indication with the second validity indication to determine if the second validity supersedes the first validity.

16. The UE of claim 15, wherein:
- the first validity indication comprises a first version indicator and the second validity indication comprise a second version indicator; and
- wherein the second validity supersedes the first validity upon the second version indicator comprising a later version than the first version indicator.

17. The UE of claim 10:
- wherein at least one of the first validity or the second validity has a timer associated therewith; and
- wherein the processing circuitry is further configured to determine whether the timer has expired to determine if the second validity supersedes the first validity.

18. The UE of claim 10 wherein the processor configured to modify the stored set of parameters comprises is further configured to modify the store set of parameters based on one or more modifications selected from the group consisting of:
- replace a parameter in the stored set of parameters with a corresponding parameter from the second set of parameters,
- add a parameter from the second set of parameters to the stored set of parameters,
- remove a parameter from the stored set of parameters based on information contained in the second set of parameters.

19. A system for managing dedicated and common system information, the system comprising:
- a network node configured to transmit a first message comprising a first set of parameters associated with a first type of system information, the first set of parameters having a first validity, and the first type of system information is common system information or dedicated system information;
- a user equipment configured to receive the first message and derive a stored set of parameters based, at least in part, on the first set of parameters and its associated validity;
- wherein the network node is further configured to transmit a second message comprising a second set of parameters associated with a second type of system information, the second set of parameters having a second validity, and the second type of system information is common system information or dedicated system information wherein the first and second type of system information are different;
- wherein the user equipment is further configured to receive the second message and, upon the second validity superseding the first validity, modify the stored set of parameters.

* * * * *